United States Patent
Sakai et al.

(10) Patent No.: US 6,449,140 B1
(45) Date of Patent: Sep. 10, 2002

(54) SOLID ELECTROLYTIC CAPACITOR ELEMENT AND METHOD FOR PRODUCING THE SAME

(75) Inventors: Atsushi Sakai; Yuji Furuta; Katsuhiko Yamazaki; Takashi Ichimura, all of Nagano (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/899,992

(22) Filed: Jul. 9, 2001

Related U.S. Application Data (60) Provisional application No. 60/245,574, filed on Nov. 6, 2000, now abandoned.

(30) Foreign Application Priority Data

Jul. 7, 2000 (JP) ......................................... 2000-207172

(51) Int. Cl.[7] .................................................. H01G 9/04
(52) U.S. Cl. ..................................... 361/532; 29/25.03
(58) Field of Search ................................. 361/523, 524, 361/525, 528, 529, 532; 29/25.03

(56) References Cited

U.S. PATENT DOCUMENTS

| | | | |
|---|---|---|---|
| 4,805,074 A | * | 2/1989 | Harakawa et al. ........... 29/25.03 |
| 5,187,650 A | * | 2/1993 | Kudoh et al. ..................... 29/3 |
| 5,424,907 A | * | 6/1995 | Kojima et al. .............. 29/25.03 |
| 6,212,064 B1 | * | 3/2001 | Aoki et al. .................... 361/523 |

FOREIGN PATENT DOCUMENTS

| | | |
|---|---|---|
| JP | 2-15611 | 1/1990 |
| JP | 8-253677 | 10/1996 |
| JP | 10-32145 | 2/1998 |
| JP | 11-80596 | 3/1999 |

\* cited by examiner

Primary Examiner—Anthony Dinkins
(74) Attorney, Agent, or Firm—Sughrue Mion, PLLC (57) ABSTRACT

The present invention provides a solid electrolytic capacitor having a structure that relieves thermal stress, prevents leakage current, exhibits low impedance and ensures high reliability. The solid electrolytic capacitor element has a valve-acting metal substrate with a dielectric film and an edge part acting as an anode, an insulating layer circumferentially provided on the substrate, a solid electrolyte layer and an electrically conducting layer having a carbon paste layer and a metal powder-containing electrically conducting layer formed in this order on the entire substrate surface opposite to the anode with respect to the insulating layer and acting as a cathode. The electrically conducting layer is provided within a region of the carbon paste layer or with a spacing from the cathode side edge part of the insulating layer. The present invention also provides a method for producing the element, and a solid electrolytic capacitor using the element.

16 Claims, 3 Drawing Sheets

SOLID ELECTROLYTIC CAPACITOR ELEMENT AND METHOD FOR PRODUCING THE SAME

CROSS REFERENCE TO RELATED APPLICATIONS

This application is an application filed under 35 U.S.C. §111(a) claiming benefit pursuant to 35 U.S.C. §119(e)(1) of the filing date of Provisional Application No. 60/245,574 filed Nov. 6, 2000 pursuant to 35 U.S.C. §111(b).

FIELD OF THE INVENTION

The present invention relates to a solid electrolytic capacitor element in which the edge part of a valve-acting metal substrate having on the surface thereof a dielectric film acts as the anode, and an insulating layer having a predetermined width is circumferentially provided on the substrate to come into contact with the anode part. On the entire surface of the substrate on the side opposite the anode with respect to the insulating layer, a solid electrolyte layer comprising an organic material such as electrically conducting polymer or an inorganic material such as metal oxide and further thereon an electrically conducting layer are sequentially formed to work out to the cathode. The present invention also relates to a method for producing the capacitor element; and a solid electrolytic capacitor using the element.

BACKGROUND OF THE INVENTION

With the progress of digitization and high frequency processing of electronic instruments for reducing the size, saving electric power and the like, there is an increasing demand for a solid electrolytic capacitor having low impedance at a high frequency, high reliability and high capacitance.

As a capacitor satisfying these capabilities, a capacitor using a tantalum sintered body or an aluminum foil for the anode and a solid electrolyte formed of an electrically conducting polymer having high electrical conductivity or an inorganic oxide for the cathode is commercially available. Particularly, a chip-type capacitor that is surface-mounted on an electronic circuit board is designed to employ a highly heat-resistant material capable of enduing the heat of reflow soldering or to have a structure capable of relieving thermal stress. However, the above-described solid electrolyte is poor in the capability of repairing the dielectric film, although the resistance is low, and in some cases, the dielectric film is macroscopically broken due to thermal stress to increase the leakage current.

SUMMARY OF THE INVENTION

An object of the present invention is to construct a solid electrolytic capacitor element having a capability of relieving the thermal stress generated in the reflow soldering or the like to prevent an increase of leakage current and to provide a solid electrolytic capacitor favored with low impedance and high reliability.

Figure 1:
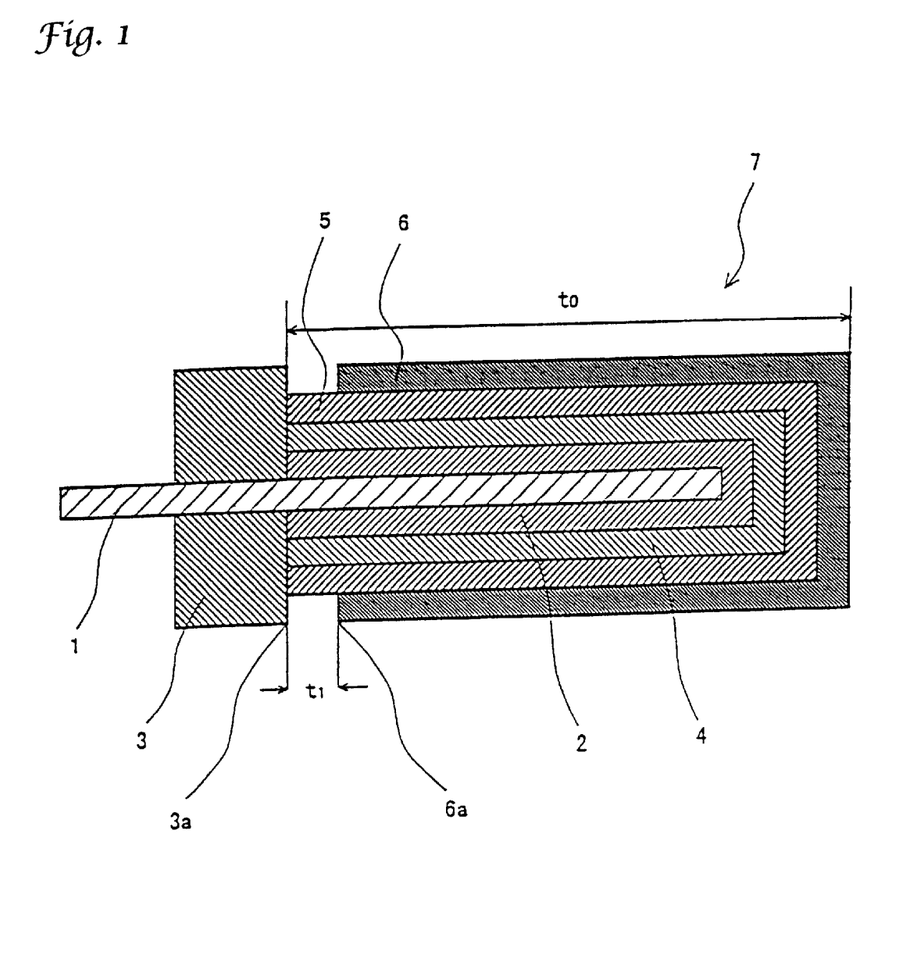
FIG. 1 is a cross-sectional view showing the structure of a solid electrolytic capacitor element according to the present invention.

The outline of the solid electrolytic capacitor element of the present invention is described below by referring to FIG. 1 showing a cross section.

In FIG. 1, (1) is a valve-acting metal substrate (anode substrate) having on the surface thereof a dielectric film (2), (3) is an insulating layer having a predetermined width and circumferentially provided on the valve-acting metal substrate, (4) is a solid electrolyte layer, (5) is a carbon paste layer, and (6) is a metal powder-containing electrically conducting layer.

The solid electrolytic capacitor of the present invention, by which the described-above objects can be attained, has a structure such that the metal powder-containing electrically conducting layer (6) constituting the cathode part does not contact with the insulating layer (3) which works out to the boundary with the anode part, while preventing increase in the resistance of the metal powder-containing electrically conducting layer (6). More specifically, a spacing ($t_1$) is provided between the cathode side edge part (3a) of the insulating layer and the insulating layer side edge part (6a) of the metal powder-containing electrically conducting layer to prevent the metal powder-containing electrically conducting layer (6) to run beyond the region of the carbon paste layer (5), so that electrical conduction can be reduced in the vicinity thereof and an increase in leakage current can be prevented.

Furthermore, a structure for preventing the increase in ESR (equivalent series resistance) is also employed, where the relative ratio of the spacing ($t_1$) between the cathode side edge part (3a) of the insulating layer and the insulating layer side edge part (6a) of the metal powder-containing electrically conducting layer to the length ($t_0$) of the cathode part (7) is specified.

In the embodiment constructed as such, a substance having high electrically conductivity (the metal powder-containing electrically conducting layer) is not present in the vicinity of the insulating layer and the metal powder-containing electrically conducting layer is kept apart from the insulating layer. Therefore, even when the insulating layer is partially broken under mechanical or thermal stress, the electrical conduction hardly occurs in the vicinity thereof and the leakage current does not increase.

The term "circumferentially provided" as used in the present specification means to encompass a certain site. The term "placed on" is not limited only to the vertical relationship but includes the state where two substances are disposed to contact each other. The term "join" means to connect and bond two members.

That is, the present invention provides a solid electrolytic capacitor element, a method for producing the capacitor element, and a solid electrolytic capacitor, which are described below.

(1) A solid electrolytic capacitor element comprising (1) a valve-acting metal substrate having on a surface thereof a dielectric film with an edge part acting as an anode, (2) an insulating layer circumferentially provided on said valve-acting metal substrate, (3) a solid electrolyte layer and (4) an electrically conducting layer comprising a carbon paste layer and a metal powder-containing electrically conducting layer, said solid electrolyte layer and said electrically conducting layer being formed in this order on an entire surface of the substrate on a side opposite said anode with respect to the insulating layer and acting as a cathode part, wherein said metal powder-containing electrically conducting layer is provided within a region of the carbon paste layer, such that said metal powder-containing electrically conducting layer does not contact the insulating layer.

(2) A solid electrolytic capacitor element comprising (1) a valve-acting metal substrate having on a surface thereof a dielectric film with an edge part acting as an anode, (2) an insulating layer circumferentially provided on said valve-acting metal substrate, (3) a solid electrolyte layer and (4) an electrically conducting layer comprising a carbon paste layer and a metal powder-containing electrically conducting layer, said solid electrolyte layer and said electrically conducting layer being formed in this order on an entire surface of the substrate on a side opposite said anode with respect to the insulating layer and acting as a cathode part, wherein said metal powder-containing electrically conducting layer is provided with a spacing from a cathode side edge part of said insulating layer.

(3) The solid electrolytic capacitor element as described in 2 above, wherein the spacing between said metal powder-containing electrically conducting layer and the cathode side edge part of said insulating layer is about 1/10 or more but less than 1/2 of the entire length of said cathode part.

(4) The solid electrolytic capacitor element as described in 2 or 3 above, wherein the spacing between said metal powder-containing electrically conducting layer and the cathode side edge part of said insulating layer is from about 0.1 to about 1.5 mm.

(5) The solid electrolytic capacitor element as described in 1 above, wherein said metal powder-containing electrically conducting layer comprises an electrically conducting filler comprising metal powder, and a fluororubber as a main component of a binder.

(6) The solid electrolytic capacitor element as described in 5 above, wherein about 80% by mass or more of the binder is fluororubber.

(7) The solid electrolytic capacitor element as described in 5 above, wherein about 80% by mass or more of the electrically conducting filler is silver powder.

(8) The solid electrolytic capacitor element as described in 5 above, wherein said metal powder-containing electrically conducting layer comprises from about 50 to about 95% by mass of the electrically conducting filler and from about 5 to about 50% by mass of the binder.

(9) The solid electrolytic capacitor element as described in 1 above, wherein the carbon paste layer comprises an electrically conducting carbon material, a binder and a solvent as main components, about 80% by mass or more of said electrically conducting carbon material is an artificial graphite, and said binder comprises a material having rubber elasticity.

(10) The solid electrolytic capacitor element as described in 1 above, wherein the valve-acting metal has a plate or foil shape.

(11) The solid electrolytic capacitor element as described in 1 above, wherein the valve-acting metal is an elemental metal selected from the group consisting of aluminum, tantalum, niobium and titanium, or the valve-acting metal is an alloy of said elemental metal.

(12) The solid electrolytic capacitor element as described in 1 above, wherein the solid electrolyte layer comprises an electrically conducting polymer layer.

(13) The solid electrolytic capacitor element as described in 12 above, wherein the electrically conducting polymer layer comprises a polymer of a 5-member heterocyclic ring-containing compound.

(14) The solid electrolytic capacitor element as described in 13 above, wherein the 5-member heterocyclic ring-containing compound comprises a structure of bivalent thiophene skeleton.

(15) The solid electrolytic capacitor element as described in 12 above, wherein the electrically conducting polymer layer comprises poly(3,4-ethylenedioxythiophene).

(16) A solid electrolytic capacitor obtainable by placing at least one capacitor element as described in any one of 1 to 15 on a lead frame and joining these.

(17) A method for producing a solid electrolytic capacitor element, comprising a valve-acting metal substrate having on a surface a dielectric film; circumferentially providing an insulating layer on a position defining an edge part acting as an anode of the valve-acting metal substrate; and sequentially forming a solid electrolyte layer and an electrically conducting layer comprising a carbon paste layer and a metal powder-containing electrically conducting layer on an entire surface of the substrate on a side opposite said anode with respect to said insulating layer, wherein said metal powder-containing electrically conducting layer is provided within a region of the carbon paste layer, such that said metal powder-containing electrically conducting layer does not contact the insulating layer.

(18) A method for producing a solid electrolytic capacitor element, comprising a valve-acting metal substrate having on a surface a dielectric film; circumferentially providing an insulating layer on a position defining an edge part acting as an anode of the valve-acting metal substrate; and sequentially forming a solid electrolyte layer and an electrically conducting layer comprising a carbon paste layer and a metal powder-containing electrically conducting layer on an entire surface of the substrate on a side opposite said anode with respect to said insulating layer, wherein said metal powder-containing electrically conducting layer is provided with a spacing from a cathode side edge part of said insulating layer.

DESCRIPTION OF THE PRESENT INVENTION

The present invention is described in detail below.

The present invention provides a capacitor element where a metal powder-containing electrically conducting layer is kept apart from the insulating layer and a positional relationship between the metal powder-containing electrically conducting layer and the carbon paste layer is specified. The present invention also provides a method for producing the capacitor element and a solid electrolytic capacitor using the element.

According to the present invention, the spacing ($t_1$) between the cathode side edge part (3a) of the insulating layer and the cathode side edge part (6a) of the metal powder-containing electrically conducing layer is about 1/10 or more of the length of the cathode part (7) with the maximum being less than 1/2 of the length of the cathode part (7) of the element. The spacing ($t_1$) between the cathode side edge part (3a) of the insulating layer and the insulating layer side edge part (6a) of the metal powder-containing electrically conducting layer is preferably about 1/8 or more of the length of the cathode part (7) with the maximum being about 3/8 or less of the length of the cathode part (7) of the element. With the spacing in this range, a high yield can be attained while preventing an increase in ESR and in leakage current, even when the dielectric film is microscopically broken due to thermal or mechanical stress generated in the reflow soldering or the like.

The capacitor element of the present invention is manufactured by allowing the edge part of a valve-acting metal substrate (1) having on the surface thereof a dielectric film layer (2) to act as an anode, circumferentially providing an insulating layer (3) having a predetermined width on the substrate to come into contact with the anode part, and on the dielectric film layer exclusive of the anode part and the insulating layer part, sequentially forming a solid electrolyte layer (4) and further thereon an electrically conducting layer comprising a carbon paste layer (5) and a metal powder-containing electrically conducting layer (6).

The valve-acting metal substrate may be sufficient if it is an elemental metal selected from aluminum, tantalum, niobium and titanium, or an alloy thereof. The shape thereof may be any of plate, foil, sintered body and the like. For example, in the case of a metal foil, the thickness varies depending on the use end but is generally on the order of 40 to 150 μm. The size and the form also vary depending on the use; however, the plate-like element unit is preferably in a rectangular form having a width of approximately from 1 to 15 mm and a length of approximately from 1 to 15 mm, more preferably having a width of approximately from 2 to 10 mm and a length of approximately from 2 to 7 mm.

The insulating layer circumferentially provided may be formed by coating a composition comprising an insulating resin, an inorganic fine powder and a cellulose-based resin (see, JP-A-11-80596 (the term "JP-A" as used herein means an "unexamined published Japanese patent application")) or by attaching an insulating tape.

The insulating material is not particularly limited. Specific examples thereof include polyphenylsulfone, polyethersulfone, cyanic ester resin, fluororesin (e.g., tetrafluoroethylene, tetrafluoroethylene/perfluoroalkyl vinyl ether copolymer), low molecular weight polyimide and derivatives thereof, and a composition comprising soluble polyimidesiloxane and epoxy resin (see, JP-A-8-253677). The method for providing the insulating layer is also not particularly limited and the method may be sufficient if an insulating layer can be formed to a predetermined width on a substrate.

The solid electrolyte layer may be formed using any one of an electrically conducting polymer, an electrically conducing organic material and an electrically conducting inorganic oxide. A plurality of materials may be sequentially coated or a composite material may be coated. A known electrically conducing polymer is preferably used, such as an electrically conducting polymer containing as a repeating unit any one divalent group selected from pyrrole, thiophene, furan and aniline structures, or at least one substitution derivative thereof. For example, a method where a 3,4-ethylenedioxythiophene monomer and an oxidizing agent, each preferably in the solution form, are coated separately one after another or simultaneously on the dielectric film of a metal foil (see, JP-A-2-15611 and JP-A-10-32145), may be used.

In the electrically conducting polymer, a dopant is generally used. The dopant may be any compound as long as it has a doping ability and examples of the dopant which can be used include an organic sulfonic acid, an inorganic sulfonic acid, an organic carboxylic acid, and salts thereof. In general, an aryl sulfonate-based dopant is used. Examples of the salt which can be used include salts of benzenesulfonic acid, toluenesulfonic acid, naphthalenesulfonic acid, anthracene sulfonic acid, anthraquinonesulfonic acid, and a substitution derivative thereof. Also, a compound, which can bring out particularly excellent capacitor performance, can be used, and examples thereof include a compound containing one or more sulfonic acid group and a quinone structure, a heterocyclic sulfonic acid, an anthracenemonosulfonic acid, and salts thereof. These dopants may be used individually or in combination of two or more thereof.

The electrically conducting layer is generally formed by coating a carbon paste and a paste containing electrically conducting metal powder, but may also be formed by a method other than the coating.

In the present invention, metal powder other than silver powder, such as gold and copper, may also be used as the electrically conducing filler used in the paste for forming the metal powder-containing electrically conducting layer, but silver powder is most preferred. The silver powder is preferably contained to occupy 80% by mass or more of the filler as a whole. The particle size is preferably from about 1 to about 10 μm in terms of the average particle size. If the average particle size is less than about 1 μm, the bulk density is small, the paste volume increases and this is disadvantageous for the formation of the electrically conducting layer. If the average particle size exceeds about 10 μm, the metal powder is excessively coarse and connection failure readily occurs with the cathode lead terminal.

Although the electrically conducting layer may be formed using only the above-described paste for the metal powder-containing electrically conducting layer of the present invention, usually, a layer (5) formed by a carbon paste is provided on the electrically conducting polymer layer (4) and a layer (6) formed by the metal powder-containing electrically conducting paste of the present invention is provided thereon. In particular, the silver powder migrates, and therefore, it is preferred to first coat a carbon paste and then coat thereon a silver powder-containing electrically conducting paste.

Examples of the carbon paste that can be used include natural graphite, carbon black and artificial graphite. Among these, preferred is artificial graphite. The artificial graphite powder preferably has an average particle size of approximately 1 to 13 μm and an aspect ratio of approximately 10 or less. Also, in the artificial graphite, the ratio of particles having a particle size of about 32 μm or more is approximately 12% by mass or less. The binder resin used in the carbon paste is preferably fluororubber which is used as the binder resin of the paste for the metal powder-containing electrically conducting layer described below. The thickness of the carbon paste layer (5) may be approximately from 1 to 5 μm.

The binder of the electrically conducing metal powder-containing paste is a material having rubber elasticity (hereinafter sometimes referred to as a "rubber elastic body") and having properties of, when distorted, repelling the distortion and recovering the original shape, preferably a material further having capability of swelling or suspending in a solvent in the practical embodiment. A rubber elastic body having excellent heat resistance in a reflow soldering treatment at the production of a capacitor is used. Specific examples thereof include isoprene rubber, butadiene rubber, styrene/butadiene rubber, nitrile/butadiene rubber, isoputylene/isoprene rubber, ethylene/propylene copolymer (e.g., EPM, EPDM), polysulfide rubber, fluororubber (e.g., VDF/HFP, VDF/HFP/TFE), silicone rubber and other thermoplastic elastomers. Compared with epoxy resin, which is generally used as the binder, these materials are high in modulus of elasticity and low in water absorptivity and provide an effect of relieving the stress in the bonded portion. Among these, fluororubber is preferred.

In particular, a binder mainly comprising fluororubber is preferred and a binder containing from approximately 80 to 100% by mass of fluororubber is more preferred. The remaining component of the binder may be a resin or the like conventionally used.

The fluororubber used in the present invention has rubber elasticity of, when distorted, repelling the distortion and recovering the original shape and differs from fluororesin which cannot repel the distortion and recover the original shape.

Examples of the fluororubber which can be used include vinylidene fluoride-based copolymer rubber, hexafluoropropylene-based copolymer rubber, tetrafluoroethylene-based copolymer rubber, fluorine-containing acrylate rubber and fluorine-containing silicone rubber. These rubbers are also distinguished from fluororesin in that, in the unvulcanized state, the glass transition point (Tg) is lower than room temperature.

The electrically conducting filler and the binder are preferably mixed in such a ratio that the electrically conducting filler is approximately from 50 to 95% by mass and the binder resin is approximately from 5 to 50% by mass. If the electrically conducting filler is less than about 50% by mass, the electrically conductivity decreases, whereas if it exceeds 95% by mass, the bonding strength of the binder (less than 5% by mass) lowers and the formation of electrically conducting layer becomes difficult.

In order to impart a suitable viscosity as a paste to the mixture (solid contents) of the electrically conducting filler and the binder, an organic solvent is usually added. In general, the amount of the organic solvent is suitably from about 40 to about 100 parts by mass per 100 parts by mass of the solid contents. Examples of the organic solvent which can be used include butyl acetate, amyl acetate and propyl acetate. Depending on the solvent, the fluororubber swells or dissolves, and fluororubber which dissolves in a solvent is preferred.

For forming the electrically conducting polymer, a known method may be used, such as chemical polymerization of a monomer for forming the polymer by an oxidizing agent (polymerization initiator), electrolytic polymerization or a combination thereof. For example, an operation of dipping a valve-acting metal having an oxide film layer in a monomer solution and then in an oxidizing agent solution and heating it to undergo chemical polymerization is repeated several times. By virtue of this repeated polymerization, the electrically conducting polymer layer can form a multilayer stacked structure (e.g., chimera structure, fibril structure), and excellent resistance against thermal stress can be exhibited during molding with an armoring resin.

The advantages of the electrically conducting metal powder-containing layer using a fluororubber binder which is preferably used in the present invention, is described below.

The electrically conducting polymer layer has a multilayer stacked structure and excellent resistance against thermal stress, but if an electrically conducting paste using a binder having a large heat shrinkage, such as epoxy resin, is coated thereon, the paste infiltrates into the surface layer of the electrically conducting polymer. This paste generates a large stress during heating, and affects the multilayer shape of the electrically conducing polymer. On the other hand, when a binder containing a rubber elastic body, such as fluororubber binder, is used, the thermal stress generated in the paste infiltrated into the surface layer of the electrically conducting polymer is small, and the shape of the electrically conducting polymer layer provided is maintained, whereby the capacitor can have good heat resistance.

Examples of the oxidizing agent used for the chemical polymerization include ammonium persulfate, organic ferric sulfonate, inorganic acid iron such as ferric chloride, $Fe(ClO_4)_3$, organic acid iron(III), persulfate, alkyl persulfate, hydrogen peroxide and $K_2Cr_2O_7$.

Figure 2:
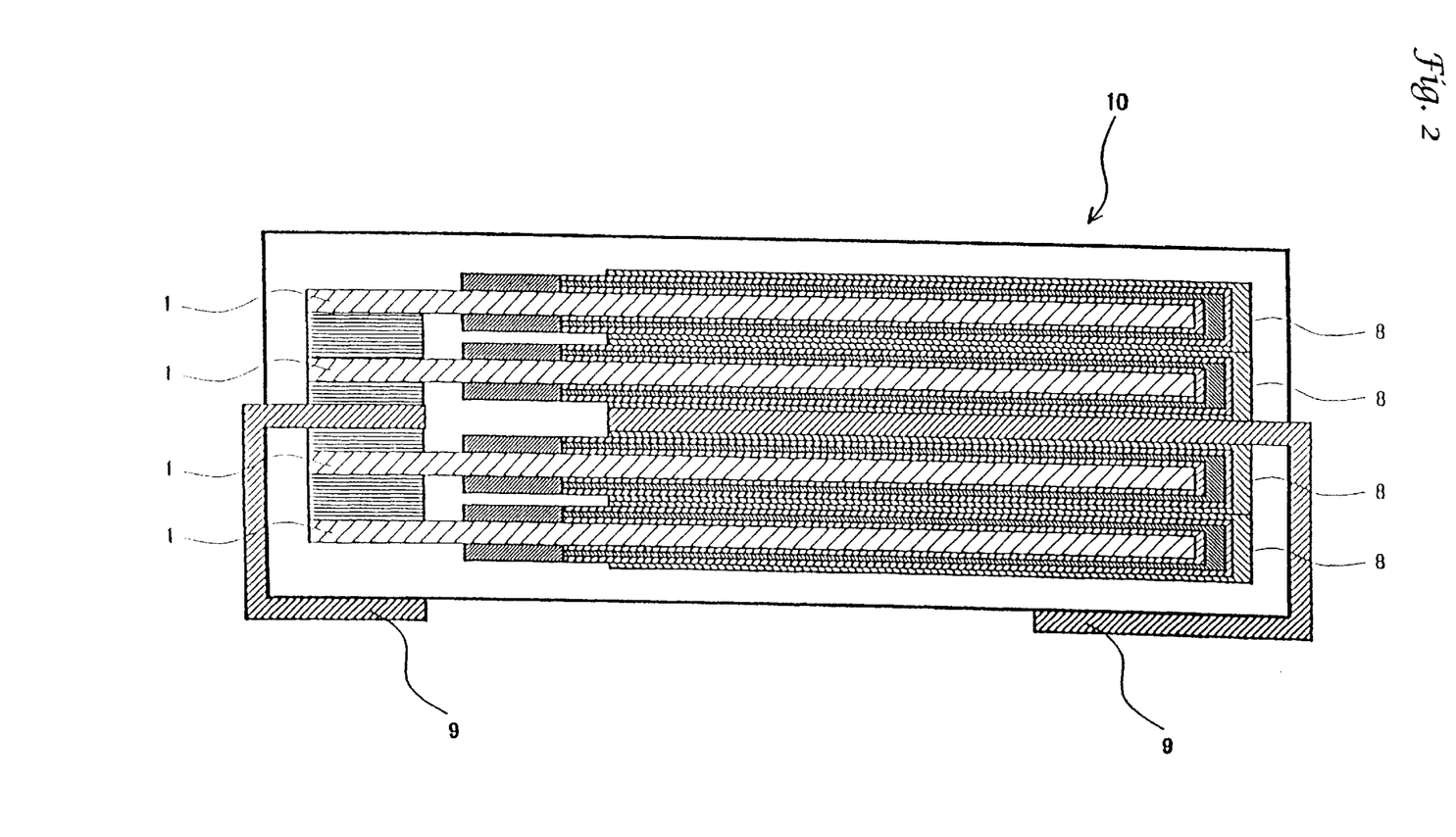
FIG. 2 is a cross-sectional view of a solid electrolytic multilayer capacitor element according to the present invention.

On the surface of the solid electrolyte layer (4), the carbon paste layer (5) and the metal powder-containing electrically conducting layer (6) are formed. The metal powder-containing electrically conducting layer (6) is contacted and joined with the solid electrolyte layer to act as the cathode and at the same time, works out to an adhesive layer for connect-bonding a cathode lead terminal (9) of the final capacitor product (see, FIG. 2). The thickness of the metal powder-containing electrically conducting layer (6) is generally from about 10 to 50 μm.

The capacitor element of the present invention can provide the same effect also when two or more elements are stacked to fabricate a multilayer capacitor element. In the case of a solid electrolytic multilayer capacitor, the element is preferably processed by chamfering the lead frame, more specifically, shaving, thereby slightly flattening or rounding the corner parts so that the concentration of stress in the vicinity of corners of the element can be relieved.

The material of the lead frame is not particularly limited and may be a material generally used but the lead frame is preferably constructed by a copper-based material (for example, Cu—Ni, Cu—Sn, Cu—Fe, Cu—Ni—Sn, Cu—Co—P, Cu—Zn—Mg or Cu—Sn—Ni—P alloy) or a material obtained by plating the surface of a copper-based material. If such is the case, an effect such as reduction in the resistance by the design of the lead frame shape or good workability in chamfering of the lead frame can be obtained.

EXAMPLES

The present invention is described in greater detail below by referring to the Examples and Comparative Examples, however, the present invention should not be construed as being limited thereto. Unless indicated otherwise herein, all parts, percents, ratios and the like are by mass.

Example 1

A single plate capacitor element having a structure shown in FIG. 1 was manufactured as follows. An area of 1 mm (length)×3 mm (width) in the edge part of an aluminum etched foil (anode substrate (1)) having on the surface thereof a dielectric film and cut (slit) into a predetermined size of 100 μm (thickness), 6 mm (length) and 3 mm (width) was used as the anode part. In contact with the anode part, an insulating layer (3) was circumferentially provided to a width of 1 mm. The area, except for the anode part and the insulating layer part (4 mm in length and 3 mm in width), was subjected to chemical forming at 13 V in 10% by mass of an aqueous ammonium adipate solution to form a dielectric film (2) on the cut end part (cut surface). This substrate was dipped in an aqueous solution prepared to have 20% by mass of ammonium persulfate and 0.1% by mass of sodium anthraquinone-2-sulfonate, and subsequently dipped in 1.2 mol/l of an isopropanol solution having dissolved therein 5 g of 3,4-ethylenedioxythiophene (Baytron M (trademark), produced by Bayer AG). Thereafter, the substrate was taken out and left standing in an environment at 60° C. for 10 minutes, thereby completing the oxidative polymerization. After repeating this polymerization reaction treatment 25 times, the substrate was washed with water. Thus, a solid electrolyte layer (4) of electrically conducting polymer was formed.

Subsequently, the area having the electrically conducting polymer layer was dipped in a carbon paste (prepared by mixing as the paste solid contents 50% by mass of artificial graphite powder and 50% by mass of Viton SVX (trademark, produced by Du Pont Dow elastomers, a vinylidene fluoride/tetrafluoroethylene/hexafluoropropylene copolymer), adding thereto butyl acetate as a solvent and kneading the mixture to a solid content of 20% by mass), and the carbon paste was solidified to form a carbon paste layer (5) to the cathode side edge part of the insulating layer. Furthermore, this area was dipped in a silver paste (prepared by mixing as paste solid contents 85% by mass of silver powder and 15% by mass of Viton, adding butyl acetate as a solvent, and kneading the mixture to a solid content of 60% by mass), and the silver paste was solidified to form a silver powder-containing electrically conducting layer (6). As a result, a single plate capacitor element shown in FIG. 1 was obtained, where the spacing $t_1$ between the cathode side edge part (3a) of the insulating layer and the insulating layer side edge part (6a) of the silver powder-containing electrically conducting layer was 0.5 mm, and the length (to) of the cathode part 7 was 4 mm.

Four sheets of the thus-obtained single plate capacitor elements (8) were stacked and bonded using the same silver paste. The stacked elements were placed on a lead frame (copper alloy) (9) and bonded thereto using the silver paste to obtain a multilayer capacitor element (10) shown at FIG. 2. The anodes were joined and thereafter, the multilayer element as a whole was molded with an epoxy resin (EME-7320A, produced by Sumitomo Bakelite) and aged at 120° C. for 2 hours by applying thereto a rated voltage. In this way, 30 units in total of solid electrolytic multilayer capacitors were manufactured. Each capacitor element was measured with respect to the initial characteristics, capacitance and loss factor (tan δ×100%) at 120 Hz, and also the equivalent series resistance (ESR) at 100 kHz as an index for impedance showing the resistance against the alternating current of the capacitor and the leakage current (LC) were measured. The leakage current was measured 1 minute after the rated voltage was applied. Average values of respective measured values, the defective ratio when a leakage current of 6 μA or more was considered defective, and the results in the reflow soldering test are shown in Table 1. The average of the leakage current values is a value calculated exclusive of the defective units. The reflow soldering test was performed by passing the element through a temperature zone of 230° C. over 30 seconds and in the evaluation, an element showing a leakage current of 12 μA or more was considered defective, and an element showing 300 μA or more was considered short circuit.

Example 2

Capacitors were manufactured and evaluated in the same manner as in Example 1, except that the spacing $t_1$ between the cathode side edge part (3a) of the insulating layer and the insulating layer side edge part (6a) of the silver paste layer was 1 mm. The results obtained are shown in Table 1.

Example 3

Capacitors were manufactured and evaluated in the same manner as in Example 1, except that the spacing $t_1$ between the cathode side edge part of the insulating layer and the insulating layer side edge part of the silver paste layer was about 1.4 mm. The results obtained are shown in Table 1.

Example 4

Capacitors of Example 4 were manufactured and evaluated in the same manner as in Example 2, except for using sodium 4-morpholinepropanesulfonate in place of sodium anthraquinone-2-sulfonate in Example 2. The results obtained are shown in Table 1.

Example 5

Capacitors of Example 5 were manufactured and evaluated in the same manner as in Example 2, except for using sodium anthracene-1-sulfonate in place of sodium anthraquinone-2-sulfonate in Example 2. The results obtained are shown in Table 1.

Example 6

Capacitors of Example 6 were manufactured and evaluated in the same manner as in Example 2, except for using sodium 1-naphthalenesulfonate in place of sodium anthraquinone-2-sulfonate and using N-methylpyrrole in place of 3,4-ethylenedioxythiophene in Example 2. The results obtained are shown in Table 1.

Comparative Example 1

Capacitors were manufactured and evaluated in the same manner as in Example 1, except that the spacing $t_1$ between the cathode side edge part of the insulating layer and the insulating layer side edge part of the metal powder-containing electrically conducting layer (silver paste layer) was 0 mm. The results obtained are shown in Table 1.

Comparative Example 2

Capacitors were manufactured and evaluated in the same manner as in Example 1, except that the spacing $t_1$ between the cathode side edge part of the insulating layer and the insulating layer side edge part of the silver paste layer was 2 mm. The results obtained are shown in Table 1.

Comparative Example 3

Figure 3:
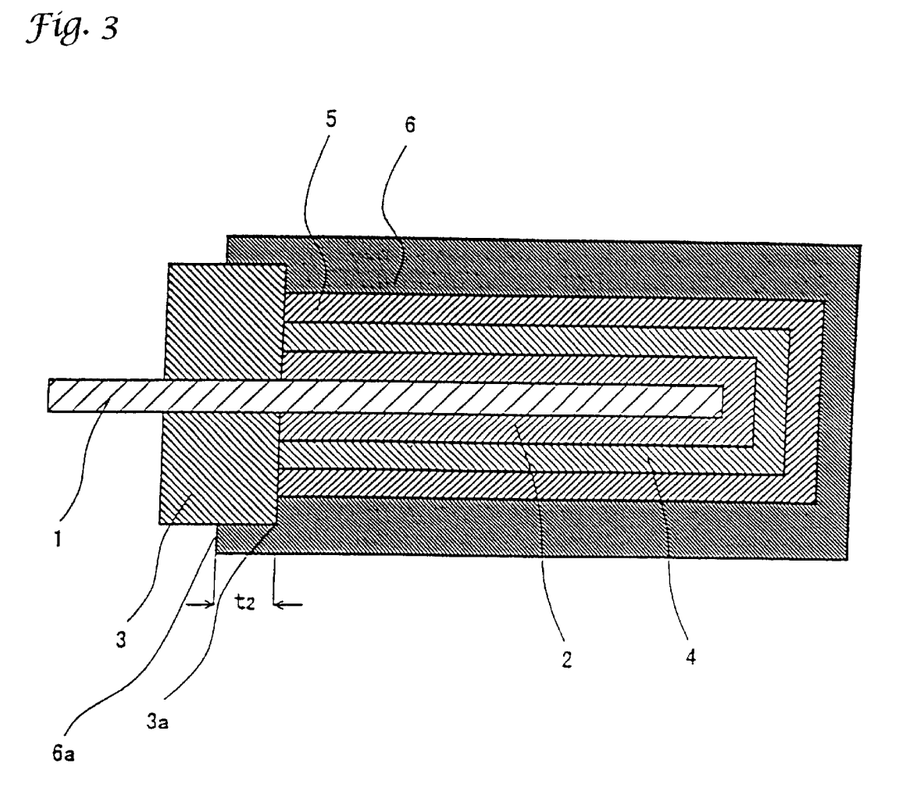
FIG. 3 is a cross-section view of a comparative solid electrolytic capacitor element where the metal powder-containing electrically conducting layer (silver paste layer) runs over the carbon paste layer.

Capacitors were manufactured and evaluated in the same manner as in Example 1, except that the silver paste layer provided on the carbon paste layer was formed to run over and cover the insulating layer in the portion of $t_2$ =0.5 mm from the cathode side edge part of the insulating layer as shown in FIG. 3. The results obtained are shown in Table 1.

TABLE 1

|  | Characteristics of Capacitor | | | | | Reflow Soldering Test | |
| --- | --- | --- | --- | --- | --- | --- | --- |
|  | Capacitance (μF) | Loss Factor (%) | ESR (mΩ) | LC (μA) | Defective Ratio* | Defective Ratio* | Number of Short Circuit |
| Example 1 | 51.8 | 0.68 | 9 | 0.12 | 0/30 | 0/30 | 0 |
| Example 2 | 51.7 | 0.68 | 13 | 0.11 | 0/30 | 0/30 | 0 |
| Example 3 | 51.8 | 0.67 | 21 | 0.12 | 0/30 | 0/30 | 0 |

TABLE 1-continued

|  | Characteristics of Capacitor | | | | | Reflow Soldering Test | |
| --- | --- | --- | --- | --- | --- | --- | --- |
|  | Capacitance ($\mu$F) | Loss Factor (%) | ESR (m$\Omega$) | LC ($\mu$A) | Defective Ratio* | Defective Ratio* | Number of Short Circuit |
| Example 4 | 50.3 | 0.69 | 10 | 0.28 | 0/30 | 0/30 | 0 |
| Example 5 | 49.2 | 0.68 | 12 | 0.25 | 0/30 | 0/30 | 0 |
| Example 6 | 50.8 | 0.69 | 15 | 0.29 | 0/30 | 0/30 | 0 |
| Comparative Example 1 | 51.8 | 0.70 | 8 | 0.41 | 2/30 | 2/28 | 2 |
| Comparative Example 2 | 51.7 | 0.68 | 38 | 0.10 | 0/30 | 0/30 | 0 |
| Comparative Example 3 | 51.9 | 0.71 | 7 | 0.89 | 5/30 | 6/25 | 5 |

*Defective Ratio: number of defectives/number of tested elements

According to the present invention, an electrically conducting layer comprising a carbon paste and a metal powder-containing electrically conducting layer is provided by forming the metal powder-containing electrically conducting layer within the region of the carbon paste layer. The metal powder-containing electrically conducting layer is also formed with a spacing from the cathode side edge part of the insulating layer, so that the solid electrolytic capacitor manufactured can be favored with low impedance, and an increase in leakage current can be prevented, even when subject to the thermal or mechanical stress generated in the reflow soldering or the like.

While the invention has been described in detail and with reference to specific embodiments thereof, it will be apparent to one skilled in the art that various changes and modifications can be made therein without departing from the spirit and scope thereof.

What is claimed is:

1. A solid electrolytic capacitor element comprising (1) a valve-acting metal substrate having on a surface thereof a dielectric film with an edge part acting as an anode, (2) an insulating layer circumferentially provided on said valve-acting metal substrate, (3) a solid electrolyte layer and (4) an electrically conducting layer comprising a carbon paste layer and a metal powder-containing electrically conducting layer (6) comprising an electrically conducting solid electrolyte layer and said electrically conducting layer being formed in this order on an entire surface of the substrate on a side opposite said anode with respect to the insulating layer and acting as a cathode part, wherein said metal powder-containing electrically conducting layer is provided within a region of the carbon paste layer, such that said metal powder-containing electrically conducting layer does not contact the insulating layer.

2. The solid electrolytic capacitor element as claimed in claim 1, wherein about 80% by mass or more of the binder is fluororubber.

3. The solid electrolytic capacitor element as claimed in claim 1, wherein about 80% by mass or more of the electrically conducting filler is silver powder.

4. The solid electrolytic capacitor element as claimed in claim 1, wherein said metal powder-containing electrically conducting layer comprises from about 50 to about 95% by mass of the electrically conducting filler and from about 5 to about 50% by mass of the binder.

5. The solid electrolytic capacitor element as claimed in claim 1, wherein the carbon paste layer comprises an electrically conducting carbon material, a binder and a solvent as main components, about 80% by mass or more of said electrically conducting carbon material is an artificial graphite, and said binder comprises a material having rubber elasticity.

6. The solid electrolytic capacitor element as claimed in claim 1, wherein the valve-acting metal has a plate or foil shape.

7. The solid electrolytic capacitor element as claimed in claim 1, wherein the valve-acting metal is an elemental metal selected from the group consisting of aluminum, tantalum, niobium and titanium, or the valve-acting metal is an alloy of said elemental metal.

8. The solid electrolytic capacitor element as claimed in claim 1, wherein the solid electrolyte layer comprises an electrically conducting polymer layer.

9. The solid electrolytic capacitor element as claimed in claim 8, wherein the electrically conducting polymer layer comprises a polymer of a 5-member heterocyclic ring-containing compound.

10. The solid electrolytic capacitor element as claimed in claim 9, wherein the 5-member heterocyclic ring-containing compound comprises a structure of bivalent thiophene skeleton.

11. The solid electrolytic capacitor element as claimed in claim 8, wherein the electrically conducting polymer layer comprises poly(3,4-ethylenedioxythiophene).

12. A method for producing a solid electrolytic capacitor element, comprising a valve-acting metal substrate having on a surface a dielectric film; circumferentially providing an insulating layer on a position defining an edge part acting as an anode of the valve-acting metal substrate; and sequentially forming a solid electrolyte layer and an electrically conducting layer comprising a carbon paste layer and a metal powder-containing electrically conducting layer on an entire surface of the substrate on a side opposite said anode with respect to said insulating layer, said solid electrolytic capacitor element comprising (1) a valve-acting metal substrate having on a surface thereof a dielectric film with an edge part acting as an anode, (2) an insulating layer circumferentially provided on said valve-acting metal substrate, (3) a solid electrolyte layer and (4) an electrically conducting layer comprising a carbon paste layer and a metal powder-containing electrically conducting layer (6), said solid electrolyte layer and said electrically conducting layer being formed in this order on an entire surface of the substrate on a side opposite said anode with respect to the insulating layer and acting as a cathode part, wherein said metal powder-containing electrically conducting layer is provided with a spacing from a cathode side edge part of said insulating layer of about 1/10 or more but less than 1/2 of the entire length of said cathode part.

13. A method for producing a solid electrolytic capacitor element, comprising a valve-acting metal substrate having on a surface a dielectric film; circumferentially providing an insulating layer on a position defining an edge part acting as an anode of the valve-acting metal substrate; and sequentially forming a solid electrolyte layer and an electrically conducting layer comprising a carbon paste layer and a metal powder-containing electrically conducting layer on an entire surface of the substrate on a side opposite said anode with respect to said insulating layer, said solid electrolytic capacitor element comprising (1) a valve-acting metal substrate having on a surface thereof a dielectric film with an edge part acting as an anode, (2) an insulating layer circumferentially provided on said valve-acting metal substrates, (3) a solid electrolyte layer and (4) an electrically conducting layer comprising a carbon paste layer and a metal powder-containing electrically conducting layer (6) comprising an electrically conducting filler comprising metal powder and a binder containing a fluororubber as a main component, said solid electrolyte layer and said electrically conducting layer being formed in this order on an entire surface of the substrate on a side opposite said anode with respect to the insulating layer and acting as a cathode part, wherein said metal powder-containing electrically conducting layer is provided within a region of the carbon paste layer, such that said metal powder-containing electrically conducting layer does not contact the insulating layer.

14. A solid electrolytic capacitor element comprising (1) a valve-acting metal substrate having on a surface thereof a dielectric film with an edge part acting as an anode, (2) an insulating layer circumferentially provided on said valve-acting metal substrate, (3) a solid electrolyte layer and (4) an electrically conducting layer comprising a carbon paste layer and a metal powder-containing electrically conducting layer (6), said solid electrolyte layer and said electrically conducting layer being formed in this order on an entire surface of the substrate on a side opposite said anode with respect to the insulating layer and acting as a cathode part, wherein said metal powder-containing electrically conducting layer is provided with a spacing from a cathode side edge part of said insulating layer of about $1/10$ of more but less than $1/2$ of the entire length of said cathode part.

15. The solid electrolytic capacitor element as claimed in claim 14, wherein the spacing between said metal powder-containing electrically conducting layer and the cathode side edge part of said insulating layer is from about 0.1 to about 1.5 mm.

16. A solid electrolytic capacitor obtained by placing at least one capacitor element as claimed in any one of claims 1, 14, 15 and 2 to 11 on a lead frame and joining the at least one capacitor element to said lead frame.

* * * * *